United States Patent [19]

Schucker

[11] Patent Number: 4,914,064

[45] Date of Patent: Apr. 3, 1990

[54] HIGHLY AROMATIC POLYUREA/URETHANE MEMBRANES AND THEIR USE FOR THE SEPARATION OF AROMATICS FROM NON-AROMATICS

[75] Inventor: Robert C. Schucker, Baton Rouge, La.

[73] Assignee: Exxon Research and Engineering Company, Florham Park, N.J.

[21] Appl. No.: 108,822

[22] Filed: Oct. 14, 1987

[51] Int. Cl.$^4$ ............................................. B01J 20/28
[52] U.S. Cl. ........................................ 502/4; 521/159; 521/172; 521/173; 521/174; 528/61; 528/76; 528/80; 528/83
[58] Field of Search ..................... 502/4; 521/159, 172, 521/173, 174

[56] References Cited

U.S. PATENT DOCUMENTS

| | | | |
|---|---|---|---|
| 2,930,754 | 3/1960 | Stuckey | 210/23 |
| 2,958,656 | 11/1960 | Stuckey | 210/23 |
| 2,970,106 | 1/1961 | Benning et al. | 208/347 |
| 3,370,102 | 2/1968 | Carpenter et al. | 260/674 |
| 3,456,037 | 7/1969 | Hoeschele | 260/858 |
| 3,595,732 | 7/1971 | Tingerthal | 521/159 |
| 3,635,908 | 1/1972 | Vogt et al. | 521/159 |
| 3,655,597 | 4/1972 | Strassel | 521/172 |
| 3,715,326 | 2/1973 | Traubel et al. | 521/172 |
| 3,776,970 | 12/1973 | Strazik et al. | 260/669 |
| 3,793,241 | 2/1974 | Kyle et al. | 521/159 |
| 3,805,532 | 4/1974 | Kistner | 521/159 |
| 3,806,474 | 4/1974 | Blair | 521/159 |
| 4,086,209 | 4/1978 | Hara et al. | 260/49 |
| 4,107,151 | 8/1978 | Takahashi et al. | 528/54 |
| 4,115,465 | 9/1978 | Elfert et al. | 260/674 |
| 4,374,210 | 2/1983 | Ewen et al. | 521/159 |
| 4,532,316 | 7/1985 | Henn | 528/59 |
| 4,568,702 | 2/1986 | Mascioli | 521/174 |
| 4,590,219 | 5/1986 | Nissen et al. | 521/172 |
| 4,595,705 | 6/1986 | Werner et al. | 521/172 |
| 4,596,685 | 6/1986 | Markovs | 521/159 |
| 4,745,137 | 5/1988 | Thomas et al. | 521/172 |

FOREIGN PATENT DOCUMENTS

| | | |
|---|---|---|
| 1206294 | 6/1986 | Canada . |
| 17905 | 10/1980 | European Pat. Off. . |
| 150620 | 9/1981 | Fed. Rep. of Germany . |
| 151874 | 11/1981 | Fed. Rep. of Germany . |
| 151952 | 11/1981 | Fed. Rep. of Germany . |
| 3513980 | 10/1986 | Fed. Rep. of Germany . |
| 7239079 | 10/1972 | Japan . |
| 4143778 | 11/1979 | Japan . |
| 8087115 | 5/1983 | Japan . |
| 9059220 | 4/1984 | Japan . |
| 080082 | 10/1985 | Japan . |
| 1115570 | 6/1986 | Japan . |

OTHER PUBLICATIONS

"Quantitative DSC Evaluation Of Phase Segregation Rate In Linear Segmented Polyurethanes And Polyurethaneureas", Camberlin et al., J. Poly Science: Polymer Chemistry Edition, vol. 24, 415–423 (1983).

"Phase Segregation Kinetics In Segmented Linear Polyurethanes: Relations Between Equilibrium Time And Chain Mobility And Between Equilibrium Degree Of Segregation And Interaction Parameter", Camberlin et al., J. Poly Science Polymer Physics Edition, vol. 22, 1835–1844 (1984).

"New Linear Polyurethaneureas Based On Polyoxytetramethylene, Aliphatic Diisocyanates, And Aromatic Diamines", Knaub et al, Journal of Applied Polymer Science, vol. 32, 5627–5645 (1986).

*Primary Examiner*—William R. Dixon, Jr.
*Assistant Examiner*—E. McAvoy
*Attorney, Agent, or Firm*—Joseph J. Allocca

[57] ABSTRACT

A new membrane for the separation of aromatic hydrocarbons from mixtures of said aromatic hydrocarbons and non-aromatic hydrocarbons has been prepared comprising a highly aromatic polyurea/urethane membrane. These highly aromatic polyurea/urethane membranes are symmetric, dense film membranes made from the corresponding polyurea/urethane copolymers by standard membrane casting techniques. The polyurea/urethane copolymers are produced by reacting dihydroxy or polyhydroxy compounds, such as polyethers or polyesters having molecular weights in the range of about 500 to 5000 with aliphatic, alkylaromatic or aromatic diisocyanates or polyisocyanates and low molecular weight chain extenders, such as diamines, polyamines or amino alcohols.

The membrane made from the polyurea/urethane copolymer, useful for the separation of aromatics from mixtures thereof with non-aromatics, in, for example, a naphtha feed stream, is characterized by possessing a urea index of at least about 20% but less than 100%, an aromatic carbon content of at least about 15 mole percent, a functional group density of at least about 10 per 100 grams of polymer and a C=O/NH ratio of less than about 8.0.

As stated, these membranes are useful for separating aromatics from non-aromatics in petroleum refining and chemical applications.

9 Claims, No Drawings

HIGHLY AROMATIC POLYUREA/URETHANE MEMBRANES AND THEIR USE FOR THE SEPARATION OF AROMATICS FROM NON-AROMATICS

BRIEF DESCRIPTION OF THE INVENTION

Aromatic polyurea/urethane membranes have been fabricated which are characterized by possessing a urea index, defined as the percentage of the total of urea and urethane groups that are urea, of at least about 20% but less than 100%, an aromatic carbon content of at least about 15 mole percent, a functional group density of at least about 10 per 1000 grams of polymer and a C=O/NH ratio of less than about 8. The aromatic polyurea/urethane membranes are particularly useful for separating aromatics from non-aromatics, e.g. aromatics from saturates, especially for upgrading naphtha streams. Such separations are preferably performed under pervaporation or perstraction conditions.

BACKGROUND OF THE INVENTION

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

DETAILED DESCRIPTION OF THE INVENTION

As previously stated, an aromatic polyurea/urethane membrane is described which is useful for the separation of aromatics from non-aromatics, e.g. aromatics from saturates as, for example, in upgrading aromatics containing streams in petroleum refineries, such streams including by way of example and not limitation naphtha streams, heavy cat naphtha streams, intermediate cat naphtha streams, light aromatic streams boiling in the $C_5$-300° F. range, LCCO boiling in the 400°-650° F. range and in chemical operations.

The preferred aromatic polyurea/urethane membrane is a symmetric, dense membrane characterized by possessing a urea index, defined as the percentage of the total of urea and urethane groups that are urea, of at least about 20% but less than 100%, an aromatic carbon content of at least about 15 mole percent, a functional group density of at least about 10 per 1000 grams of polymer, and a C=O/NH ratio of less than about 8.

The aromatic polyurea/urethane membrane is produced employing standard membrane casting procedures using an aromatic polyurea/urethane copolymer which is itself prepared by reacting dihydroxy or polyhydroxy compounds (e.g., polyethers or polyesters of about 250 to 5000 molecular weight, or mixtures of different molecular weight polymers of the same type, i.e. about 30:70/70:30 mixtures of an about 500 molecular wt. component (polyester or polyether) and an about 2000 molecular wt. component (polyester or polyether)) with aliphatic, alkylaromatic or aromatic diisocyanates or polyisocyanates and low molecular weight chain extenders, such as diamines, polyamines or amino alcohols. The choice of the molecular weight of the polyether or polyester component is a matter of compromise. Polyether or polyester components of 500 molecular weight give membranes of highest selectivity, but lower flux. Polyesters or polyethers of higher molecular weight (e.g. 2000) give membranes of lower selectivity but higher flux. Thus, the choice of the single molecular weight or blend is a matter of choice and compromise between selectivity and flux. The ratio of these components used in producing the polyurea/urethane copolymer is governed by the aforementioned characteristics possessed by the membranes useful for aromatic from saturate separation. The copolymer produced possesses a urea index of at least about 20% but less than 100%, preferably at least about 30% but less than 100%, most preferably at least about 40% but less than 100%. By urea index is meant the percentage of urea groups relative to the total urea plus urethane groups in the polymer. The copolymer also contains at least about 15 mole percent, and preferably at least about 20 mole percent aromatic carbon, expressed as a percent of the total carbon in the polymer. The copolymer also possesses a particular density of functional groups (DF ratio) defined as the total of C=O+NH per 1000 grams of polymer, the density of functional group being at least about 10, preferably at least about 12 or greater. Finally, to insure that the functional groups are not mostly carbonyl, the C=O/NH ratio is less than about 8 and preferably less than about 5.0. This insures that there is sufficient hydrogen bonding within the polymer to result in strong polymer chain interactions and high selectivity.

Urethane and polyurethane membranes which do not possess the characteristics recited above are inferior for the separation of aromatics from saturates when compared to the membranes of the present invention. Polyurea/urethane membranes which are not aromatic (i.e. contain less than at least about 15 mole percent aromatic carbon expressed as a percent of the total carbon in the polymer) are inferior to the aromatic polyurea/urethane membranes which are the subject of the present invention.

The membranes of the present invention are especially well suited for separating aromatics from saturates in heavy feeds, such as heavy cat naphtha, wherein the constituents making up the feed include, in some cases, highly complex, multi-ring, heavily substituted aromatic species.

As previously stated, the membranes are produced by standard casting techniques from a polyurea/urethane copolymer made from dihydroxy or polyhydroxy compounds, such as polyethers or polyester of 500 to 5000 molecular weight, reacted with aliphatic, alkylaromatic or aromatic diisocyanates or polyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either a straight or branched chain configuration). Aromatic dicarboxylic acids refer to those materials having the general structure HOOCRCOOH where R is:

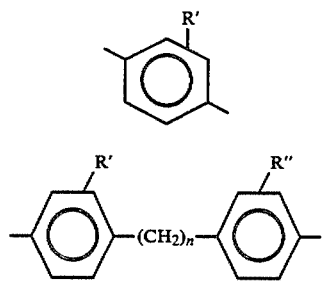

wherein R' and R" may be the same or different and are selected from the group consisting of H and $C_1$-$C_5$ carbons or $C_6H_5$ and combinations thereof, and n is 0 to 4. It is to be understood that in the above formula each R' or R" may itself represent a mixture of H, $C_1$-$C_5$ or $C_6H_5$.

Dialcohols have the general structure HOROH where R may be

—(CH$_2$)$_n$—   III

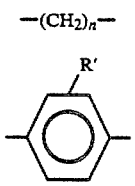

where n is 1 to 10, preferably 4 to 6, and R' is H, $C_1$ to $C_5$ or $C_6H_5$ or

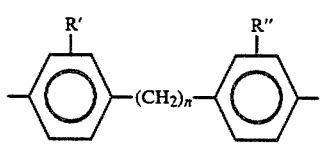

where R', R" and n are defined in the same manner as for the aromatic dicarboxylic acids.

The diisocyanates are preferably aromatic diisocyanates having the general structure:

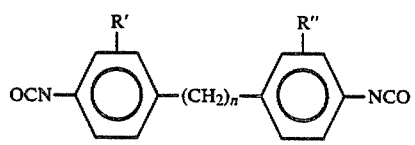

wherein R' and R" are the same or different and are selected from the group consisting of H, $C_1$-$C_5$ and $C_6H_5$ and n ranges from 0 to 4.

Diamine chain extenders have the general formula $H_2NRNH_2$ where R includes aliphatic and aromatic moieties such as

where n is 1 to 10.

Also included are diamine chain extenders of the formula:

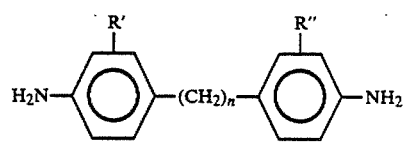

where R' and R' are the same or different and are selected from the group consisting of H or Cl or a $C_1$ to $C_5$ or $C_6H_5$ and n ranges from 0 to 4.

Examples of the polyether polyols useful in the present invention as polymer precursors are polyethylene glycols, (PEG), polypropylene glycol (PPG), polytetramethylene glycol, PEG/PPG random copolymers, etc. having molecular weight ranging from about 250 to 4000. Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyanate (TODI). Aromatic diisocyanates are exemplified by 4,4'-diisocyanato diphenylmethane (MDI). Polyisocyanates are exemplified by polymeric MDI (PMDI) and carbodiimide modified MDI. Useful polyamines are exemplified by polyethyleneimines and 2,2',2" triaminotriethylamine. Useful amino alcohols are exemplified by 6-aminohexanol, 4-aminophenol, 4-amino-4'-hydroxydiphenylmethane.

The above are presented solely by way of example. Those skilled in the art, with the present teaching before them, can select from the innumerable materials available the various starting materials which upon combination as described herein will produce. a polyurea/urethane copolymer having the desired characteristics which can then be cast into the membranes useful for the separation of aromatics from saturates.

The membranes are produced by preparing the corresponding polyurea/urethane copolymer in an appropriate solvent, such as dimethyl formamide (DMF), to produce a pourable or spreadable solution. Polymer concentration in this casting solution ranges between about 15-40 wt %, preferably about 20-25 wt %. The casting solution is then poured or spread on an appropriate support medium, such as a metal or glass plate or, if desired, a woven fiber backing, such as woven fiber glass, nylon, polyester, etc. can be used if solvent removal during the casting sequence employs a vacuum, but preferably, or a non-woven backing, such as porous polypropylene or porous teflon is employed. In general, however, backing materials used are those which are not attacked by the solvent(s) used to produce the polyurea-urethane copolymer casting solution.

The membrane may be cast in any thickness, membranes ranging in thickness of from about 0.1 to about 50 microns being preferred.

Alternatively a very thin layer of the polyurea/urethane copolymer can be deposited into a highly permeable, non-selective polyurethane layer producing a composite membrane comprising a thin dense layer of polyurea/urethane membrane about 0.1 to 5 microns thick on a permeable, non-selective, thick polyurethane. The thick layer of polyurethane (about 20 to 100 microns thick) serves as a support layer permitting one to produce thin, dense, selective layers of polyurea/urethane which would otherwise be mechanically unmanageable due to their thinness. Due to the chemical similarity between the polyurethane support layer and the polyurea/urethane selective layer, the two layers interact through hydrogen bonding to produce a very strong adhesion.

If one were to use this technique to produce sheet material, the thick, permeable polyurethane layer can be deposited on a suitable backing material such as porous fiber glass, polyethylene, polypropylene, nylon, teflon, etc. after which the thin, dense selective polyurea/urethane layer would be deposited onto the polyurethane layer.

In producing hollow fibers or tubes using this composite membrane technique, first a tube or fiber of permeable polyurethane is produced after which a thin dense layer of the selective polyurea/urethane material is deposited on either the outer or inner surface of the tube or fiber support.

The permeable polyurethane layer can be prepared from polyether glycols such as polypropylene glycol or polybutylene glycol plus aliphatic and/or aromatic diisocyanates (preferably aliphatic diisocyanates) using polyols (diols or triols) preferably aliphatic diols as chain extenders. These permeable polyurethane sublayers will possess characteristics well outside the minimums recited for the polyurea/urethane membranes taught herein. Polyurethane membrane materials which satisfy the above requirement of permeability are the polyurethane membranes described in U.S. Pat. No. 4,115,465.

Membrane made of the polymer possessing the recited characteristics can also be either anisotropic in form or be a thin film composite.

The preparation of an anisotropic membrane possessing the desired characteristics is the subject of copending application U.S. Ser. No. 108,821, now U.S. Pat. No. 4,828,773, filed even date herewith in the names of Feimer, Koenitzer and Schucker. The preferred anisotropic membrane is produced by preparing a casting solution of the polyurea/urethane copolymer having the above recited characteristics in a solvent containing less than about 5 vol.% non-solvent, preferably about 0 vol.% non-solvent, the preferred solvent being dimethylformamide, to produce a casting solution. A thin film of the casting solution is deposited on a support having a maximum pore size of less than about 20 microns (e.g. glass, metal, release paper, etc), exposing the thin film on support to conditions of temperature and time such that the solvent vapor pressure-time factor is about 1000 mm Hg-min and less, preferably about 200 mm Hg-min and less, and quenching the membrane film in a non-solvent such as water yielding the desired anisotropic membrane. The anisotropic membrane produced possesses a three layer structure, a thin dense layer generated at the film/support interface, a thin non-continuous skin which is generated at the membrane-quench solvent interface and an open, porous structure which exists between the aforementioned thin dense layer and thin non-continuous skin layer.

Thin film composites can be prepared either from suspension deposition as taught in copending application U.S. Ser. No. 108,819, now U.S. Pat. No. 4,861,628, filed even date herewith in the name of Robert C. Schucker or from solution deposition as taught in copending application U.S. Ser. No. 108,820, now U.S. Pat. No. 4,837,054 filed even date herewith in the name of Robert C. Schucker.

In U.S. Ser. No. 108,819, now U.S. Pat. No. 4,861,628, the thin film composite membrane constituting a thin layer of polymer deposited on a thick-permeable support layer is produced by preparing a fine dispersion of discrete polyurea/urethane polymer particles in a solvent which does not react with or dissolve the selected thick-permeable support layer. The dispersion is contacted with only one face of the support layer. The solvent is permitted to evaporate and the composite membrane results. The support layer will generally have pores ranging from 0.005 to 0.5 microns. Typical support include polyamide, polyimide, polyacrylonitrile, polybenzimidazole, teflon, cellulose acetate and polyolefins such as polyethylene and polypropylene.

The polymer suspension is deposited as a thin layer (about 2 microns or less) on the support structure. Polymer concentration in the suspension dispersion can range from about 0.5 to about 10%, preferably about 1 to about 5%, most preferably about 2%. Non-dissolving solvents are 1,4-dioxane, cellosolve acetate, tetrahydrofuran, ketones (e.g. acetone) and aromatic solvents such as toluene or xylenes.

Thin film composites can also be produced from solutions, as taught in U.S. Ser. No. 108,820, now U.S. Pat. No. 4,837,054. In that procedure the polyurea/urethane copolymer is prepared in a solution consisting of (a) an aprotic solvent such as dimethylformamide (DMF) (b) a cyclic ether such as dioxane, (c) cellosolve acetate or methyl cellosolve and (d) a wetting agent such as crotyl alcohol to produce a casting solution which is then deposited as a thin film onto a microporous support, excess solution permitted to drain from the support, and the solvent permitted to evaporate leaving a thin active layer on the support backing. Supports which are insoluble in the solvents used to produce the casting solution are e.g. polyolefin (e.g. polyethylene and polypropylene) and teflon. The support possess a molecular weight cut-off in the range of about 10,000 to 100,000. The solvent is used in a parts per hundred ratio of a/b/c/d in the range about 3-27/94-33/2-33/1-7. The polymer concentration in the solution can range up to about 40 parts or more polymer in the solution based on 100 parts solvent. Preferred polymer concentration is in the range 0.5 to 20 parts polymer, preferably 1-10 parts polymer, more preferably 1-5 parts polymer per 100 parts solvent.

Due to the extreme thinness of the dense selective polyurea/urethane layer the composite membrane exhibits extremely high flux while maintaining a very high degree of selectivity.

The solvent is permitted to evaporate with the application of heat if needed to drive off the solvent. If a solvent of a low enough vapor pressure is employed the application of heat can be omitted.

The membranes are useful for the separation of aromatics from saturates in petroleum and chemical streams, and have been found to be particularly useful for the separation of large substituted aromatics from saturates as are encountered in heavy cat naphtha streams. Other streams which are also suitable feed streams for aromatics from saturates separation are intermediate cat naphtha streams, (200°–320° F.) light aromatics content streams boiling in the $C_5$–300° F. range, light catalytic cycle oil boiling in the 400°–650° F. range as well as streams in chemical plants which contain recoverable quantities of benzene, toluene, xylene (BTX) or other aromatics in combination with saturates. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and re-emerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher should be used. Temperatures of about 170° C. have been successfully used with polyurea/urethane membranes of the present invention, the maximum upper limit being that temperature at which either the membrane is physically damaged. Vacuum on the order of 1–50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side.

Most conveniently, the membrane is used in a hollow fiber configuration with the feed introduced on the exterior side of the fiber, the sweep liquid flowing on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

The present invention will be better understood by reference to the following Examples which are offered by way of illustration and not limitation.

MEMBRANE EXAMPLE 1

A prepolymer was made from 16.61 grams (0.0161 mole) of polypropylene glycol (MW=1000) and 5.79 grams (0.0332 mole) toluene diisocyanate. Infrared spectra showed no trace of residual hydroxyl groups. Exactly 3.01 grams (0.00223 mole) of the resulting prepolymer were dissolved in dimethylformamide (DMF), to which was added 0.428 grams (0.00213 mole) of 4,4'-diamino-diphenyl ether. The mixture was heated to 50° C. for 1 hour and a film was cast directly onto a glass plate using a 7 mil casting knife and dried in an oven overnight at 60° C. The film was quite stretchy.

MEMBRANE EXAMPLE 2

A prepolymer was made from 96.4 grams (0.050 mole) of polyethylene adipate (MW=1928) and 25.0 grams (0.100 mole) of 4,4'-diisocyanato-diphenylmethane. Approximately 6.10 grams (0.00251 mole) of this prepolymer were dissolved in DMF, to which was added 0.6377 grams (0.00239 mole) of 4,4'-diamino-3,3'-dichloro-diphenylmethane (MOCA). The solution was stirred until its viscosity increased and cast onto a microporous Teflon sheet (0.2 micron pore size) using a 5 mil casting knife. It was then placed in an oven at 130° C. for 1 hour.

MEMBRANE EXAMPLE 3

Approximately 7.35 grams (0.00303 mole) of the prepolymer from Membrane Example 2 were dissolved into DMF, to which was added 0.5667 grams (0.00286 mole) of 4,4'-diamino-diphenylmethane. The solution was cast onto a 0.02 micron pore size Teflon sheet and heated at 130° C. for 45 minutes.

MEMBRANE EXAMPLE 4

A prepolymer was prepared from 51.0 grams (0.05 mole) of polybutylene glycol (MW=1050) and 25.0 grams (0.10 mole) 4,4'-diisocyanato-diphenylmethane. Approximately 5.93 grams (0.00390 mole) of this prepolymer were dissolved into DMF, to which was added 1.00 gram (0.00375 mole) of 4,4'-diamino-3,3'-dichloro-diphenylmethane. The resulting polymer solution was cast onto a 0.2 micron pore size Teflon sheet using 7 mil casting knife and heated at 130° C. for 1 hour.

MEMBRANE EXAMPLE 5

A prepolymer was prepared from 24.60 grams (0.025 mole) of polyethylene adipate (MW=984) and 12.50 grams (0.050 mole) of 4,4'-diamino-diphenylmethane. Approximately 4.99 grams (0.00336 mole) of this prepolymer were dissolved into DMF, to which was added 0.8546 gram (0.00320 mole) of 4,4'-diamino-3,3'-dichloro-diphenylmethane. The resulting polymer solution was cast onto a 0.2 micron pore size Teflon sheet and heated at 130° C. for 30 minutes.

MEMBRANE EXAMPLE 6

Approximately 2.06 grams (0.000848 mole) of the prepolymer from Membrane Example 2 were dissolved into DMF, to which as added 0.0188 gram of a 6.60 weight percent solution of di-n-butyl tin dilaurate catalyst in dioxane. The resulting solution was cast directly onto a glass plate and exposed to moisture in the air for curing of the prepolymer. The resulting film was peeled from the glass for subsequent testing.

DESCRIPTION OF THE PERSTRACTION TEST

In order to evaluate the performance of each of the above membranes for aromatic/saturate separation, a perstraction test was carried out in the following manner. Approximately 350 ml of feed was placed into the right hand side of a perstraction apparatus. The membrane to be tested was then clamped between a feed vessel of the perstraction apparatus and the sweep chamber which was approximately 3 mm deep. The feed was stirred magnetically and heated to the desired temperature. Sweep liquid was distilled from the permeate receiver and recirculated through the sweep chamber, thus carrying away permeate. The sweep liquid was typically chosen to be an alkane that was much lighter than the feed for ease of separation. Feeds evaluated in this study were comprised of heavy cat naphtha (149° C.–221° C. boiling range), or mixtures of model compounds simulating the components of heavy cat naphtha. If model compounds were used, a low volatile internal standard was added to the permeate receiver to facilitate quantitative chromatographic analysis of the permeate as a function of time. For heavy cat naphtha (HCN) feeds, the perstraction test was allowed to run for a fixed period of time, whereupon the sweep liquid was distilled off, leaving the permeate behind for analysis. The feeds used in these studies are shown in Tables 1 to 3.

TABLE 1

| MODEL FEED A | |
|---|---|
| Component | Weight % |
| 1,3,5-trimethylbenzene (mesitylene) | 40 |
| 1,2,3,5-tetramethylbenzene (isodurene) | 10 |
| 1-decene | 20 |
| n-decane | 30 |

TABLE 2

| MODEL FEED B | |
|---|---|
| Component | Weight % |
| 1,4-dimethylbenzene (p-xylene) | 10 |
| 1,3,5-trimethylbenzene (mesitylene) | 35 |
| 1,2,3,5-tetramethylbenzene (isodurene) | 20 |
| 1-decene | 8 |
| n-decane | 27 |

TABLE 3

| HEAVY CAT NAPHTHA FEED | |
|---|---|
| Component | Volume % (by FIA) |
| Aromatics | 68.5 |
| Olefins | 9.9 |
| Saturates | 21.6 |

| Distillation (ASTM D2887B) (°C.) | |
|---|---|
| 5 Weight % | 166 |
| 10 | 182 |
| 20 | 196 |
| 30 | 201 |
| 40 | 204 |
| 50 | 207 |
| 60 | 209 |
| 70 | 212 |
| 80 | 217 |
| 90 | 223 |
| 95 | 228 |
| 99 | 257 |

EXAMPLES 1 TO 5

Perstraction tests using Feed A were run on five of the membranes prepared in the previous Examples; and the results are shown in the following table. All tests were run at 80° C. using n-heptane as the sweep liquid at >10 cc/min sweep rate.

TABLE 4

| Example | 1 | 2 | 3 | 4 | 5 |
|---|---|---|---|---|---|
| Membrane | 1 | 4 | 2 | 3 | 5 |
| Flux (kg/m²/d) | 108 | 50.1 | 10.6 | 20.7 | 1.7 |
| Selectivity* versus n-Decane to | | | | | |
| Mesitylene | 1.41 | 2.14 | 5.56 | 5.88 | 6.19 |
| Isodurene | 1.40 | 1.86 | 4.63 | 4.69 | 5.12 |
| 1-Decene | 1.11 | 1.33 | 1.87 | 1.62 | 1.69 |
| Urea Index | 51.1 | 49.0 | 48.8 | 48.5 | 48.8 |
| DF = Σ(C=O + NH)/1000 g | 6.46 | 5.51 | 12.6 | 13.0 | 12.5 |
| C=O/NH | 0.67 | 0.67 | 4.67 | 4.67 | 2.67 |
| Arom. C (Mole %) | 29.3 | 36.0 | 25.5 | 25.5 | 38.7 |

$$*\text{Selectivity}(\alpha) = \frac{\left[\frac{\text{Concentration Aromatics}}{\text{Concentration Saturates}}\right]_{permeate}}{\left[\frac{\text{Concentration Aromatics}}{\text{Concentration Saturates}}\right]_{feed}}$$

As can be seen from this table, it is not sufficient to meet just one of the recited criteria in order to obtain maximum selectivity. For instance, membranes in Examples 1 and 2 meet three of the criteria but because their functional groups are too far apart in the polymer (DF=6.5 and 5.5, respectively), the resulting flux is high and selectivity low. By increasing the Density Function (DF) to greater than 12 per 1000 grams of polymer, as in Examples 3–5, the selectivity was substantially improved. It should be noted that none of the membranes listed in U.S. Pat. No. 4,115,465 meet all of the requirements, primarily because only one has any urea content at all (Example 1, column 5, line 30) and it has zero aromatic carbon content, a urea index of 52%, C=O/NH=2.6 and DF=8.7.

EXAMPLES 6 TO 9

Membranes from membrane Examples 3 and 6 were run with Model Feed B to examine the effect of aromatic substitution and temperature on aromatics selectivity. The results from these runs are shown in Table 5 below.

TABLE 5

| Example | 6 | 7 | 8 | 9 |
|---|---|---|---|---|
| Membrane | 6 | 3 | 3 | 3 |
| Temperature (°C.) | 80 | 80 | 50 | 30 |
| Sweep Liquid | n-heptane | n-heptane | n-hexane | n-pent. |
| Flux (kg/m²/d) | 63.8 | 20.7 | 9.2 | 2.4 |
| Selectivity versus n-Decane to | | | | |
| p-Xylene | 6.25 | — | 12.8 | 13.3 |
| Mesitylene | 4.15 | 5.88 | 6.59 | 7.11 |
| Isodurene | 3.31 | 4.69 | 5.01 | 5.34 |
| 1-Decene | 1.38 | 1.62 | 1.52 | 1.70 |
| Urea Index | 50 | 48.5 | 48.5 | 48.5 |
| DF = Σ(C = O + NH)/1000 g | 13.2 | 13.0 | 13.0 | 13.0 |
| C = O/NH | 7.0 | 4.67 | 4.67 | 4.67 |
| Arom. C (Mole %) | 18.8 | 25.5 | 25.5 | 25.5 |

As can be seen from these Examples, membranes prepared according to the requirements outlined in this application show excellent selectivity for aromatics. Raising the aromatic carbon content of the membrane to greater than 25% (Examples 6 vs 7–9) resulted in a substantial increase in selectivity for p-xylene and good increases in selectivity for the other constituents. Lowering the temperature for the same membrane (Examples 7–9) resulted in improved selectivity.

EXAMPLE 9

Membrane 3 was then tested in the perstractive separation of the Heavy Cat Naphtha Feed shown in Table 3 using n-hexane as the sweep liquid at 50° C. Results from this test are shown in Table 6. Analysis of permeate liquid products was done by FIA (ASTM D1319).

TABLE 6

| | Feed | Permeate |
|---|---|---|
| Flux (kg/m²/d) | | 10.6 |
| Composition (vol. %) | | |
| Aromatics | 68.5 | 94.6 |
| Olefins | 9.9 | 1.2 |
| Saturates | 21.6 | 4.2 |
| Selectivity to Aromatics | | 7.1 |

TABLE 6-continued

| | Feed | Permeate |
|---|---|---|
| versus Saturates | | |

As can be seen, both the flux of 10.6 kg/m²/d and the selectivity to aromatics of 7.1 are consistent with the model feed results in Example 8.

A series of polyurea/urethane membranes were made using the prepolymer method described in previous examples using polyethylene adipate of varying average molecular weights, 3,3'-diphenylmethane diisocyanate and 3,3'-diaminodiphenylmmethane in a 1:2:1 mole ratio. Membranes were cast onto glass and dried in a hot oven at 130° C. for 2 hours. Each membrane was tested in the perstraction unit at 80° C. using n-heptane as the sweep liquid. Membrane thicknesses were measured by Scanning Electron Microscopy. The table below summarizes the results of these tests.

The feed for this study was comprised of a mixture of 10% p-xylene, 10% mesitylene, 30% n-decane, 20% 1-decene, 10% isodurene, 10% naphthalene and 10% pentamethylbenzene (all by weight).

TABLE

| Example # | Avg. MW of Polyester | Permeability (kg-micron/m/d) | Selectivity to | | UI | DF | C = O/NH | % C(ar) |
|---|---|---|---|---|---|---|---|---|
| | | | p-xyl. | naphth. | | | | |
| 10 | 1927 | 410 | 9.62 | 12.00 | 50 | 12.2 | 4.67 | 25.5 |
| 11 | 1500 | 284 | 10.04 | 13.43 | 50 | 12.7 | 3.67 | 30.3 |
| 12 | 1215 | 228 | 10.45 | 14.03 | 50 | 13.1 | 3.17 | 34.6 |
| 13 | 984 | 134 | 11.74 | 16.62 | 50 | 13.1 | 2.67 | 39.1 |
| 14 | 788 | 72 | 12.06 | 17.96 | 50 | 13.0 | 2.17 | 43.9 |
| 15 | 645 | 28 | 13.70 | 19.55 | 50 | 13.0 | 1.83 | 48.0 |
| 16 | 574 | 17 | 14.59 | 20.14 | 50 | 13.0 | 1.76 | 50.7 |

EXAMPLES 17–22

Examples 17–22 are offered to demonstrate the effect of various chain extenders as well as the effect of polymer molecular weight (and the differences between single polymer of one weight (e.g. 1000) and a mix of polymers of different weights (e.g. 500 and 2000) yielding a mixture of a given weight (e.g. 1000) on selectivity and permeability. The membranes produced were evaluated on heavy catalytic naphtha under pervaporation conditions. It is seen that a 50/50 blend of 500/2000 MW polyethylene adipate (to a blend molecular weight of 1000) is more temperature stable and more selective than is a membrane made from 1000 MW polyethylene adipate per se.

EXAMPLE 17

A solution containing a polyurea-urethane polymer is prepared as follows. Fourteen point seven (14.7) grams (.0076 moles) of polyethylene adipate (MW=2000) and 3.81 grams (0.0152 moles) of 4,4'-diisocyanato-diphenylmethane are added to a 250 ml flask equipped with a stirrer and drying tube. The temperature is raised to 90° C. and held for 2 hours with stirring to produce an isocyanate-end-capped prepolymer. Twenty grams of dimethylformamide is added to this prepolymer and the mixture is stirred until clear. One point five grams (0.0076 moles) of 4,4'-diamino-diphenylmethane is dissolved in ten grams of dimethylformamide and then added as a chain extender to the prepolymer solution. This mixture was then allowed to react at room temperature (approx. 22° C.) for 20 minutes. Films were cast using a 5 mil casting knife and then placed in a convection oven at 100° C. for 1 hour.

EXAMPLE 18

The prepolymer was prepared as in Example 17. Chain extension was carried out as follows. Zero point one seven grams (0.00096 moles) of trimethyolpropane was dissolved in 35 grams of dimethylformamide and then added to the prepolymer and allowed to react for 10 min. at 85° C. After the mixture was cooled to 35° C., 1.13 grams of 4,4-diamino-diphenylmethane dissolved in 10 grams of dimethylformamide was added and allowed to react for 10 minutes. Films were cast using a 5 mil casting knife and then placed in a convection oven at 100° C. for 1 hour.

| SUMMARY OF POLYUREA-URETHANES STUDIED | | |
|---|---|---|
| | Membrane | |
| Example | Prepolymer | Chain-Extender |
| 17 | 2:1 MDI(1)/2000 MW PEA(2) | MDA(3) |
| 18 | 2:1 MDI/2000 MW PEA | 3:1 MDA/TMP(4) |
| 19 | 2:1 MDI/1000 MW PEA | 9:1 MDA/TMP |
| 20 | 2:1 MDI/1000 MW PEA | MDA |
| 21 | 2:1 MDI/(95/5) 500/2000 MW PEA | MDA |
| 22 | 2:1 MDI/(50/50) 500/2000 MW PEA | MDA |

(1)MDI - methyl-diisocyanate (4,4'-diisocyanato-diphenylmethane)
(2)PEA - polyethylene adipate
(3)MDA - methyl-dianiline (4,4'-diamino-diphenylmethane)
(4)TMP - Trimethyolpropane

| | | AROMATIC/SATURATE SEPARATION OF HCN | | | | | | |
|---|---|---|---|---|---|---|---|---|
| | | Temp | Pressure | Flux | Permeate, FIA Vol % | | | |
| Run No. | Membrane | °C. | (mbar) | (kg/m²-d) | Arom | Sat | Olef | α |
| | | | | Feed | 51.0 | 28.0 | 21.0 | |
| 1 | Example 17 | 80.0 | 1.0 | 31.6 | 87.4 | 6.1 | 6.5 | 7.9 |
| 2 | " | 100.0 | 1.0 | 56.0 | 85.4 | 5.9 | 8.7 | 7.9 |
| 3 | " | 100.0 | 10.0 | 33.0 | 82.0 | 8.2 | 9.8 | 5.5 |
| 4 | " | 120.0 | 10.0 | 310.4 | 56.2 | 24.0 | 19.8 | 1.3 |
| 1 | Example 18 | 120.0 | 10.0 | 63.4 | 83.8 | 8.1 | 8.1 | 5.7 |
| 1 | Example 19 | 100.0 | 10.0 | 21.1 | 66.5 | 17.7 | 15.8 | 2.1 |
| 1 | Example 20 | 100.0 | 10.0 | 10.4 | 84.4 | 7.8 | 7.8 | 5.9 |
| 2 | " | 120.0 | 10.0 | 17.4 | 73.5 | 14.1 | 12.4 | 2.9 |
| 3 | " | 130.0 | 10.0 | 90.1 | 65.8 | 19.5 | 14.7 | 1.9 |
| 1 | Example 21 | 130.0 | 10.0 | 14.3 | 79.0 | 10.1 | 10.9 | 4.3 |
| 1 | Example 22 | 120.0 | 5.0 | 17.2 | 83.7 | 7.7 | 8.6 | 6.0 |
| 2 | " | 130.0 | 5.0 | 41.7 | 88.0 | 5.9 | 6.1 | 8.2 |
| 3 | " | 140.0 | 5.0 | 55.2 | 85.6 | 7.3 | 7.1 | 6.4 |
| 3 | " | 170.0 | 4.0 | 128.8 | 85.3* | | | 6 |

*Based on RI correlation

EXAMPLE 19

A prepolymer was prepared as in Example 17 except that a 1000 MW polyethylene adipate was used. Chain extension was carried out as in Example 2 except that 0.11 grams (0.00062 moles) of trimethyolpropane and 2.12 grams of 4,4-diamino-diphenylmethane were used.

EXAMPLE 20

A prepolymer was prepared as in Example 17 except that a 1000 MW polyethylene adipate was used. Chain extension was carried out as in Example 17.

EXAMPLE 21

A prepolymer was prepared as in Example 17 except that 1.14 grams (0.00057 moles) of 2000 MW polyethylene adipate was blended with 5.63 grams (0.011 moles) of 500 MW polyethylene adipate and end-capped with 5.90 grams (0.023 moles) of 4,4'-diisocyanato-diphenylmethane. Chain extension was carried out as in Example 17, using 2.34 grams (0.012 moles) of 4,4'-diamino-diphenylmethane.

EXAMPLE 22

A prepolymer was prepared as in Example 17 except that 7.55 grams (0.0039 moles) of 2000 MW polyethylene adipate was blended with 1.97 grams (0.0039 moles) of 500 MW polyethylene adipate and end-capped with 3.92 grams (0.016 moles) of 4,4'-diisocyanato-diphenylmethane. Chain extension was carried out as in Example 17, using 1.55 grams (0.0078 moles) of 4,4'-diamino-diphenylmethane.

It should be clear from the preceding Examples that our polyurea/urethane membranes have excellent selectivity for not only heavy, but also light feeds (selectivity increases with decreased substitution); and that the process of perstraction is equally applicable to the full boiling range of hydrocarbons found in refineries and chemical plants.

In place of the relatively thick symmetric polyurea-/urethane membrane demonstrated above, one can utilize the previously described composite membrane made up of a thin, dense layer of polyurea/urethane membrane supported on a thick, porous layer of polyurethane. Due to the thinness of the polyurea/urethane dense layer and the porosity of the polyurethane support layer a membrane having high selectivity and high flux is produced. The following examples demonstrate the preparation of such composite membranes.

EXAMPLE 23

Composite Membrane: Polyurea/Urethane on Polyurethane Support.

A. Composite membrane-thick permeable polyurethane layer

A very permeable polyurethane sublayer is prepared as follows. Twenty grams (0.01 mole) of polypropylene glycol (MW=2000) and 5.0 grams (0.02 mole) of 4,4'-diisocyanato-diphenylmethane are added to a 250 ml flask equipped with a stirrer and drying tube. The temperature is raised to 90° C. and held for 2 hours with stirring to produce an isocyanate-capped prepolymer. To this prepolymer is added 50 ml of dimethylformamide and the mixture is stirred until clear. One point one eight grams (1.18 grams=0.01 mole) of 1,6-hexanediol are then added as a chain extender and the mixture is stirred at 90° C. for 2 hours to complete the reaction.

A second solution is prepared by adding 5.22 grams (0.03 mole) of toluene diisocyanate to 1.34 grams (0.01 mole) of trimethylolpropane in 10 ml dimethylformamide. The mixture is stirred at 50° C. for 2 hours to form an isocyanate-capped trimethylolpropane molecule.

One ml of the isocyanate-capped TMP is added to the original solution along with several drops of a solution of di-n-butyl tin dilaurate catalyst dissolved in DMF. A membrane is then cast on a glass plate using a casting knife and is heated in a convection oven at 100° C. for 2 hours. The resulting film is a lightly crosslinked polyurethane that is very permeable to both aromatic and aliphatic molecules.

B. Composite membrane-polyurea/urethane polymer

A prepolymer solution is prepared as follows. Twenty grams (0.01 mole) of polyethylene adipate (MW=2000) and 5.0 grams (0.02 mole) 4,4'-diisocyanato-diphenylmethane are added to a flask equipped with a stirrer and drying tube. The temperature is raised to 90° C. and held for 2 hours. After cooling, 50 ml of 1,4-dioxane are added to produce a coating solution containing approximately 10% prepolymer.

C. Composite membrane—depositing polyurea/urethane active layer on thick permeable polyurethane support layer The film from Example A (while still attached to the plate it was cast on) is wash coated with the solution from Example B to which was added several drops of a catalyst solution comprised of di-n-butyl tin dilaurate in 1,4-dioxane immediately prior to use. The glass plate is stood on edge to allow excess solution to drain off and exposed to a humid environment (>35% Relative Humidity) overnight for curing. The result is a composite membrane wherein the thin active layer is a polyurea/urethane copolymer. It should be appreciated that by preparing the composite film in this manner, the thin film becomes anchored to the substrate film due to the reaction between some of the isocyanate groups and amino species in the urethane and urea groups in the substrate thus forming allophanate and biuret branches.

EXAMPLE 24

A solution containing a polyurea-urethane polymer is prepared as follows. Eleven point zero eight grams (0.00575 moles) of polyethylene adipate (MW=1927.84) and 2.88 grams (0.0115 moles) of 4,4'-diisocyanato-diphenylmethane are added to a 250 ml flask equipped with a stirrer and drying tube. The temperature is raised to 90° C. and held for 2 hours with stirring to produce an isocyanate-and-capped prepolymer. Zero point one two eight five (0.1285) grams (0.000985 moles) of trimethylolpropane (TMP) was dissolved in approximately 5 grams of DMF, added to the prepolymer and allowed to react for 10 minutes at 85° C. The mixture was cooled to 35° C. Zero point eight five four (0.854) grams (0.00431 moles) of 4,4'-diamino-diphenylmethane was first dissolved in approximately 5 grams of DMF and then added to the TMP/prepolymer solution. After approximately 8 minutes a film was cast on a glass plate using a 5 mil doctor blade and then placed in a convection oven at 100° C. for 1 hour.

This membrane possessed the following characteristics

| urea index | 37.4 |
| C = O/NH | 4.72 |
| C = O + NH/1000 g | 12.1 |
| Arom Carbon | 25.8 |

The membrane was tested under pervaporation conditions at a temperature of 120° C. and a vacuum of 10 mbar on a heavy cat naphtha feed which contained 51 vol. % aromatics. Under these conditions the membrane exhibited a flux of 63.4 kg/m$^2$-d. The permeate contained 83.8 vol. % aromatics 8.1 vol. % saturates and 8.1 vol. % olefins which constitutes a separation factor of 5.7.

What is claimed is:

1. A dense non-porous polyurea/urethane membrane characterized by possessing a urea index of at least about 20% but less than 100%, an aromatic carbon content of at least about 15 mole percent, a functional group density of at least about 10 per 1000 grams of polymer and a C=O/NH ratio of less than about 8.

2. The membrane of claim 1 wherein the urea index is at least about 30% but less than 100%.

3. The membrane of claim 1 wherein the aromatic carbon content is at least about 20 mole percent.

4. The membrane of claim 1 wherein the functional group density is at least about 12.

5. The membrane of claim 1 wherein the C=O/NH ratio is less than about 5.

6. The membrane of claim 1 wherein the urea index is at least about 40% but less than 100%, the aromatic carbon content is at least about 20 mole percent, the functional group density is at least about 12 and the C=O/NH ratio is less than about 5.

7. A dense non-porous polyurea/urethane membrane characterized by possessing a urea index of at least about 20% but less than 100%, an aromatic carbon content of at least about 15 mole percent, a functional group density of at least about 10 per 1000 grams of polymer and a C=O/NH ratio of less than about 8 prepared from a polyurea/urethane copolymer made by reacting a dihydroxy or polyhydroxy compound with an aliphatic, alkylaromatic or aromatic diisocyanate or polyisocyanate and a low molecular weight chain extender.

8. The polyurea/urethane membrane of claim 7 wherein the dihydroxy or polyhydroxy compound is selected from polyethers or polyesters of about 250 to 5000 molecular weight and mixtures thereof 9. The polyurea/urethane membrane of claim 8 wherein the dihydroxy or polyhydroxy component is an about 30:70/70:30 mixture of an about 500 molecular weight component with an about 2000 molecular weight component.

* * * * *